United States Patent [19]

Porter, Jr. et al.

[11] 4,075,141
[45] Feb. 21, 1978

[54] CARBOXYLIC ACID AMIDE INTERPOLYMER-BASED COATING COMPOSITIONS

[75] Inventors: Samuel Porter, Jr., Tarentum; Bruce N. McBane, Gibsonia, both of Pa.

[73] Assignee: PPG Industries, Inc., Pittsburgh, Pa.

[21] Appl. No.: 621,109

[22] Filed: Oct. 9, 1975

[51] Int. Cl.$^2$ .............................................. C08L 5/00
[52] U.S. Cl. ........................ 260/17.2; 260/17 A; 260/17.3; 260/17.4 SG; 260/29.2 UA; 260/29.3; 260/29.4 UA; 260/72; 260/827; 260/836; 260/839; 260/840; 260/856; 260/901
[58] Field of Search ............... 260/836, 827, 839, 840, 260/901, 856, 39.3, 29.2 UA, 29.4 UA, 72, 17.2, 17.3, 17 A, 17.45 SG

[56] References Cited

U.S. PATENT DOCUMENTS

| | | | |
|---|---|---|---|
| 3,510,541 | 5/1970 | Kapalko et al. | 260/831 |
| 3,666,710 | 5/1972 | Makhlouf et al. | 260/33.6 UA |
| 3,812,067 | 5/1974 | Katsimbas et al. | 260/33.6 UA |
| 3,880,796 | 4/1975 | Christenson et al. | 260/34.2 |
| 3,926,888 | 12/1975 | Cheung et al. | 260/856 |
| 3,966,667 | 6/1976 | Sullivan et al. | 260/33.6 UA |

FOREIGN PATENT DOCUMENTS

| | | | |
|---|---|---|---|
| 1,234,897 | 2/1967 | Germany | 260/33.6 U |

*Primary Examiner*—Edward M. Woodberry
*Attorney, Agent, or Firm*—Carl T. Severini; Frank J. Troy; Chales R. Wilson

[57] ABSTRACT

Coating compositions having improved application characteristics as well as other desirable properties are prepared by adding insoluble crosslinked polymeric microparticles to solutions or dispersions of carboxylic acid amide interpolymers. The compositions may be spray coated onto various substrates in two coat applications to form coatings having improved film build, pattern control and flow control while maintaining the gloss characteristics of the film.

27 Claims, No Drawings

CARBOXYLIC ACID AMIDE INTERPOLYMER-BASED COATING COMPOSITIONS

BACKGROUND OF THE INVENTION

There are many fields in which it is desirable to use coating compositions based on carboxylic acid amide interpolymers for purposes of protection and for aesthetic reasons.

For reasons of economy, it is important that such coating compositions be applied rapidly and efficiently. In particular, with the constant striving for higher productivity in industry, methods of applying coatings (e.g., paints) to yield a standard film thickness in two coats instead of three or more and which still produce a servicable coating is clearly a desirable goal to those concerned with application of coatings in production.

In the automobile industry, for example, which is one of the important applications for such coatings, the problem of coating application acquires specific urgency. Competitive pressure requires the original production finishing of automobiles to make the most effective use of labor and materials. Economizing production line space and the capability of increasing speed of unit operations such as painting therefore become important. Topcoat finishing, for example, that can achieve the same protective film thickness and beauty with two spray applications when three or more are standard practice is regarded as a valuable modification.

Prior to this invention, commercial coatings based on carboxylic acid amide interpolymers often required at least three spray applications, particularly when pigmentation contained metallic flake, to deposit films of requisite thickness and appearance. This invention concerns the solution of the above-mentioned problems and, additionally, realizes further advantages to be mentioned below.

The invention is primarily concerned with improvement in coating compositions based on carboxylic acid amide interpolymers such as increased efficiency of application, the ability to apply a satisfactory coating in two coats rather than three, and the achievement of high gloss and excellent metallic pattern control to give an aesthetically pleasing appearance.

It has now been found that the addition of insoluble crosslinked polymeric microparticles to solutions or dispersions of carboxylic acid amid interpolymers results in compositions which are capable of being sprayed to a high film build in two coats with increased coating efficiency and the films formed have dramatically improved pattern control and resistance to solvent popping and sagging while film gloss is maintained. The ability to add such crosslinked polymeric microparticles to such coatings without decreasing gloss is unexpected and surprising since additives to such compositions heretofore generally exerted a dulling (i.e., flatting) effect on the film.

DETAILED DESCRIPTION OF THE INVENTION

The compositions of this invention contain as one component a carboxylic acid amide interpolymer. The interpolymer is combined with the crosslinked polymeric microparticles and, if desired, other additives to provide coating compositions having the improved properties.

The carboxylic acid amide interpolymers employed in the compositions of this invention contain from about 2.5 percent to about 50 percent of a substituted carboxylic acid amide, from about 1 percent to about 25 percent of an alpha, beta- ethylenically unsaturated carboxylic acid and at least one other ethylenically unsaturated monomer.

The substituted carboxylic acid amide used in the interpolymer component of the compositions of the invention is an N-alkoxyalkyl-substituted carboxylic acid amide represented by the structure:

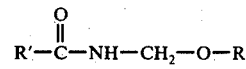

wherein R' is an aliphatic hydrocarbon radical containing from 1 to 6 carbon atoms and having a single terminal polymerizable alpha, beta-ethylenically unsaturated group and R is a lower alkyl radical containing from 1 to 8 carbon atoms.

These substituted amides are prepared by reacting an unsaturated amide (e.g., acrylamide) with formaldehyde and an alkanol (e.g., butanol) under acidic conditions and in the presence of a polymerization inhibitor. For a detailed description of this method, see U.S. Pat. No. 3,079,434, incorporated herein by reference. The resultant N-(alkoxyalkyl)acrylamide [e.g., N-(butoxymethyl)acrylamide] is then interpolymerized with the other monomers (described below) to form the interpolymer containing the substituted amide units.

The unsaturated amide which is reacted with the formaldehyde and alkanol to produce the N-alkoxyalkyl-substituted amides employed in forming the interpolymer of the compositions of the invention possesses the general structure:

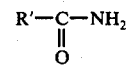

wherein R' has the significance described above. Examples of the amides that may be employed include acrylamide, methacrylamide, alpha-cyano acrylamide, crotonamide, the mono- or diamide of itaconic acid or fumaric acid, and the like. The preferred unsaturated amides are acrylamide and methacrylamide.

The preferred substituted amide used in this invention is N-(butoxymethyl)acrylamide, although other N-alkoxyalkyl-substituted unsaturated carboxylic acid amides such as N-(methoxymethyl)acrylamide, N-(propoxymethyl)acrylamide, N-(isopropoxymethyl)acrylamide, N-(isobutoxymethyl)acrylamide and N-(butoxymethyl)methacrylamide or the like may be employed. In addition, mixtures of an N-(alkoxyalkyl)acrylamide and N-methylolamide can be employed.

The interpolymer of the compositions of the invention may contain in polymerized form from about 2.5 to about 50 percent by weight of these substituted amides with a preferred range being from about 20 to about 40 percent.

The preferred alpha, beta-ethylenically unsaturated carboxylic acids employed in formulating the interpolymer are acrylic acid and methacrylic acid, but itaconic acid, crotonic acid and maleic acid, the half esters of maleic and fumaric acids may also be used. In the half esters, one of the carboxyl groups is esterified with an alcohol, the identity of which is not significant so long as it does not prevent polymerization or preclude the desired utilization of the product. Butyl hydrogen maleate and ethyl hydrogen fumarate are examples.

The interpolymer of the compositions of this invention may contain in polymerized form from about 1 to about 25 percent by weight, preferably from 5 to 10 percent of such acid units.

The other ethylenically unsaturated monomer or monomers utilized in the interpolymer may be virtually any copolymerizable monomer containing a $CH_2=C<$ group. Such monomers include monoolefinic and diolefinic hydrocarbons, halogenated monoolefinic and diolefinic hydrocarbons, unsaturated esters of organic and inorganic acids, esters of unsaturated acids, nitriles and the like. A detailed list of such ethylenically unsaturated monomers may be found in numerous patents such as, for example, U.S. Pat. Nos. 2,978,437, 3,074,434, 3,307,963, etc. However, it is desirable in order to provide desirable properties in the interpolymer to employ a combination of hardening and flexibilizing monomers.

The preferred hardening monomer is styrene but others such as vinyl toluene or alkyl methacrylates having from 1 to 4 carbon atoms can also be used. The interpolymer may contain from about 5 to about 75 percent, preferably from 40 to 60 percent, of such hardening monomer units.

The flexibilizing monomer component may be one or more alkyl or substituted alkyl esters of acrylic acid or methacrylic acid, the alkyl groups having 1 to 13 carbon atoms in the case of acrylic esters and 5 to 16 carbon atoms in the case of methacrylic esters. Ethyl acrylate, butyl acrylate, and 2-ethylhexyl acrylate, 2-ethylhexyl methacrylate, decyl methacrylate and lauryl methacrylate are examples. Ethyl acrylate is especially preferred. The interpolymer of the compositions of this invention may contain from about 5 to about 75 percent of such flexibilizing monomer units with a preferred range being from about 20 to about 50 percent of such units.

The interpolymer is formed by copolymerizing the monomers in the presence of a vinyl polymerization catalyst. The preferred catalysts are azo compounds, such as, for example, alpha, alpha'-azobis (isobutyronitrile). Other useful catalysts are tertiary-butyl perbenzoate, tertiary-butyl pivalate, isopropyl percarbonate, butyl isoperoxypropyl carbonate, and similar compounds. In some instances, other free radical catalysts such as benzoyl peroxide and cumene hydroperoxide may also be useful. The quantity of catalyst employed can be varied considerably, however in most instances it is desirable to utilize from about 0.1 percent to 3.0 percent.

Since it is desirable that the interpolymers be relatively low in molecular weight so that they can be dissolved at high solids and low viscosities, a chain modifying agent or chain transfer agent is ordinarily added to the polymerization mixture. The mercaptans, such as dodecyl mercaptan, tertiary dodecyl mercaptan, octyl mercaptan, hexyl mercaptan, and the like, are conventionally used for this purpose, as can other chain transfer agents or "short-stopping" agents such as cyclopentadiene, allyl acetate, allyl carbamate, alpha-methylstyrene, alphamethyl styrene dimers, and the like.

The interpolymer reaction which is utilized is normally carried out in an organic solvent solution medium, suitable organic solvent media and processes of interpolymerization being well known and illustrated with particularly in, for example, U.S. Pat. Nos. 2,978,437, 3,079,434, 3,307,963, 3,510,541, etc.

As is well known in the art, acrylamide-containing interpolymers of the above-described type are self-crosslinking, i.e., they will internally crosslink under the influence of heat. Accordingly, such interpolymers do not ordinarily require an external or added cross-linking agent. However, in certain coating applications where special chemical and physical property requirements are involved it is often advantageous and preferred to incorporate an external crosslinking agent to reinforce the coating. Thus, for example, in coating applications where a high degree of detergent resistance is desired, the incorporation of an external crosslinking agent to the composition provides significant advantages. Cross-linking agents suitable for that purpose in the present compositions include aminoplast resins, phenolic resins and mixtures thereof.

Aminoplast resin crosslinking agents which may be employed in the compositions of the invention when desired are well known in the art. Aminoplast resins which can suitably be employed for this purpose include amine-aldehyde resins, i.e., an aldehyde condensation product of melamine, urea, acetoguanamine, or a similar compound. Generally, the aldehyde employed is formaldehyde, although the products can be made from other aldehydes, such as, for example, acetaldehyde.

While resins produced from melamine or urea are most common and are preferred, condensation products of other amines and amides can also be employed, such as for example, those of triazines, diazines, triazoles, guanidines, guanamines, and alkyl and aryl-substituted derivatives of such compounds, including alkyl and aryl-substituted melamine, provided at least one amino group is present. Some examples of such compounds are N, N'-dimethylurea, benzyl urea, dicyandimide, formoguanamine, benzoguanamine, ammeline, 2-chloro-4-6-diamino-1,3,5-triazine, 2-phenyl-4-amino-6-hydroxyl-1,3,5-triazine, 3,5-diaminotriazole, triaminopyrimidine, 2-mercapto-4,6-diaminopyrimidine, 2,4,6-trihydrazine-1,2,5-triazine, 2,4,6-triethyltriamine-1,3,5-triazine, 2,4,6-triphenyltriamino-1,3,5-triazine, and the like.

These aldehyde condensation products contain methylol or similar alkylol groups, the structure of the alkylol group depending upon the particular aldehyde employed. At least a portion, i.e., all or part, of these alkylol groups should be etherified by reaction with an alcohol. Any monohydric alcohol can be employed for this purpose, including such alcohols as methanol, ethanol, propanol, butanol, pentanol, hexanol, heptanol, and other alkanols, usually having up to about 12 carbon atoms, as well as benzyl alcohol and other aromatic alcohols; cyclic alcohols, such as cyclohexanol; monoethers of glycols, such as the Cellosolves and carbitols; and halogen-substituted or other substituted alcohols, such as 3-chloropropanol.

The amine-aldehyde resin is produced in a manner well known in the art, using acidic or basic catalysts and varying conditions of time and temperature in accordance with conventional practice. The formaldehyde is often employed as a solution in water or alcohol, and the condensation, etherification and polymerization reactions may be carried out either sequentially or simultaneously.

Some of the preferred aldehyde condensation products of melamine include hexamethoxymethyl melamine, hexakis(methoxymethyl) melamine, ethoxymethoxymethyl melamine, hexylated methylated methylol melamine and the like.

The phenolic resins which may be employed as crosslinking agents herein include those formed by the condensation of an aldehyde and a phenol. The most used aldehyde is formaldehyde, although other aldehydes, such as acetaldehyde, can also be employed. Methylene-releasing and aldehyde releasing agents, such as paraformaldehyde and hexamethylenetetramine, can be utilized as the aldehyde agent if desired. Various phenols can be used; for instance, the phenol employed can be phenol, per se, a cresol, or a substituted phenol in which a hydrocarbon radical having either a straight chain, a branched chain or a cyclic structure is substituted for a hydrocarbon in the aromatic ring. Mixtures of phenols are also often employed. Specific illustrations of phenols which may be employed include p-phenylphenol, p-tert-butylphenol p-tert-amylphenol, cyclopentylphenol and unsaturated hydrocarbon substituted phenols such as the monobutenyl phenols containing a butenyl group in the ortho, meta, or para position and where the double bond occurs in various positions in the hydrocarbon chain, a common phenolic resin which may be employed in phenol formaldehyde resin.

In addition to the foregoing phenolic resins, other phenolic resins which can be employed as external crosslinking agents herein and which are preferred are the methylolphenol ethers of the structure:

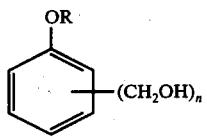

where $n$ is an integer from 1 to 3 and R is an unsaturated aliphatic group or a halogen-substituted aliphatic group. The groups represented by R can be various mono- and poly-halogenated derivatives of the above-unsaturated aliphatic groups, for example, 2-chloroallyl, 3-chloroallyl, 3-chloro-2-methallyl, 1-chloro-2-butenyl and corresponding groups containing halogens such as bromine or fluorine.

The methylol phenol ether compositions which may be employed herein are described in U.S. Pat. No. 2,597,330 and as disclosed therein can be produced from sodium or barium salts of 2,4,6-tris(hydroxymethyl) phenols which are obtained by reacting formaldehyde with phenol in the presence of sodium or barium hydroxide. Several methylol phenol ether compositions of this type are commercially available and these generally comprise mixtures of allyl ethers of mono-, di- and trimethylol phenols (substituted in the ortho, para and meta position). The trimethylolated derivative is generally the predominant component of the composition. Such commercially available methylol phenol ether compositions are preferred for use in the invention.

When it is desired to incorporate such external crosslinking units into the compositions of the invention, the amount of such crosslinkers utilized may vary considerably depending on desired results but generally from about 5 percent to about 40 percent, preferably 5 percent to 20 percent by weight based on total resin solids can be utilized.

As indicated above, the improved compositions of this invention are prepared by the addition of insoluble crosslinked polymeric microparticles (hereinafter described) to solutions or dispersions of the above-described amide interpolymers. The solvents employed in forming such solutions or dispersions are well known, as illustrated by the above patents and may be any of those conventionally employed in the amide interpolymer art. In this regard, it should be observed that the invention contemplates coating compositions regardless of whether the coating is aqueous, or as is more conventional, non-aqueous, e.g., with the interpolymer in solution in an organic solvent. Where water is desired to be utilized as the solvent medium, it is preferred and well known to form salt groups in the amide interpolymer. These salt groups impart to the interpolymer the desired degree of solubility or dispersibility in water.

One known method of forming such salt groups in the interpolymer is to first form the interpolymer which contains acid groups in a water-miscible organic solvent or mixture of such solvents and then neutralize or partially neutralize the acid groups with a basic compound such as an amine, thereby rendering the interpolymer dissolvable or dispersible in water. In neutralizing the acid groups of the interpolymer, the basic compound per se can be employed or, as is preferred, an aqueous solution of the basic compound, such as an aqueous alkali metal hydroxide or aqueous amine solution can be employed. As indicated, methods of forming the salts of such interpolymers in order to make them water-soluble or water-dispersible are well known to those skilled in the resin and coatings arts and, accordingly, will not be described in detail herein. For a more detailed description of such methods and techniques, reference may be had to numerous patents, including for example, U.S. Pat. Nos. 3,654,203, 3,661,818, 3,661,827, etc.

As will be apparent from the foregoing, in the compositions of this invention, the liquid medium containing the amide interpolymer may be either organic solvent-based or aqueous based or may consist of mixtures of water-miscible organic solvents and water. In the instant compositions, where the liquid medium consists of a mixture of organic solvents and water, it is preferred that at least 60 percent by weight and up to 90 percent by weight may be water and correspondingly from about 10 to about 40 percent by weight may be organic solvents.

One of the principal problems encountered in utilizing aqueous coating compositions (i.e., where the liquid medium is water or a mixture consisting of a major proportion of water and minor proportion of organic solvent) heretofore was a tendency of the composition to exhibit water or solvent popping and sagging, particularly where the coatings were applied in relatively thick films. Accordingly, when it is desired to utilize compositions of the invention in which the liquid medium is aqueous, it is advantageous and preferred to employ certain additives which minimize or eliminate these problems. The preferred additives for that purpose are non-volatile, water-soluble or water-dispersible polyether polyols or polyester polyols having a molecular weight of at least 300. While the polyols must have a molecular weight of at least 300 or more, they may have molecular weights up to 5000 or more provided they are water-soluble or water-dispersible. The term "non-volatile" as applied to the polyols herein means that under the curing conditions utilized not more than about 5 percent by weight of the polyol will volatilize, i.e., evaporate from the film before the film is cured.

Subject to the above limitations, essentially any such water-soluble or dispersible polyether or polyester polyol can be employed in the compositions of the invention, with the preferred polyols being polyether polyols which are the reaction products of an alkylene oxide, preferably ethylene oxide or 1,2-propylene oxide, with a polyol such as glycerine, trimethylolpropane, hexanetriol, pentaerythritol, sorbitol, sucrose or the like. The particularly-preferred polyether polyols used in the invention are the reaction products of 1,2-propylene oxide with a mono- or disaccharide such as sucrose, dextrose, lactose and alphamethyl d-glucoside. For a detailed description of the particularly preferred polyethers of mono- and disaccharides and their method of preparation see U.S. Pat. No. 3,085,085 incorporated herein by reference.

Polyester polyols which may advantageously be employed as additives include those which are formed from the polyesterification of organic polyols and organic polycarboxylic acids or acid anhydrides. The polyols and polycarboxylic acids or anhydrides are often aliphatic or aromatic diols and diacids but it is advantageous in many cases to employ polyols and polycarboxylic acids having hydroxyl or carboxyl functionalities of 3 or more.

The preferred polyols employed in forming the polyesters are diols and triols.

Diols which may be employed in making the polyester polyol include alkylene glycols such as ethylene glycol, propylene glycol, butylene glycol, hexylene glycol and neopentyl glycol and other glycols such as hydrogenated Bisphenol A, cyclohexane dimethanol, caprolactone diol (for example the reaction product of caprolactone and ethylene glycol), hydroxyalkylated bisphenols, and polyether glycols such as poly(oxytetramethylene)glycol and the like. In addition, many other diols of various types can be utilized.

Triols which are preferably employed in making the polyester polyols include compounds such as trimethylolpropane, trimethylolethane, 1,2,2-propanetriol, 1,2,4-butanetriol, polycaprolactone triols and triols based on adducts of propylene oxide and glycerine.

Polycarboxylic acids which may be employed in making the polyester polyol consist primarily of monomeric carboxylic acids or anhydrides having 2 to 14 carbon atoms per molecule. Among the acids which are useful are phthalic acid, isophthalic acid, terephthalic acid, tetrahydrophthalic acid, hexahydrophthalic acid, adipic acid, sebacic acid, maleic acid, glutaric acid, chlorendic acid, tetrachlorophthalic acid, and other dicarboxylic acids of varying types.

The polyester may include minor amounts of monobasic acids, such as benzoic acid, and there may also be employed herein polycarboxylic acids such as trimellitic acid and tricarballylic acid (where acids are referred to above, it is understood that the anhydrides of those acids which form anhydrides can be used in place of the acid). It is preferred that the polyester include an aliphatic dicarboxylic acid as at least part of the acid component.

The polyester polyols useful herein also include polyester amide polyols, and polyhydric compounds having polyester structures but not formed from the freaction of a polyol and a polycarboxylic acid. Examples of this latter type includes the so-called lactone polyesters, such as the polycaprolactone polyols described in U.S. Pat. No. 3,169,945 to Hostettler et al.

The water-soluble or dispersible polyether or polyester polyols may be incorporated into the compositions in several ways. Thus, the polyether or polyester polyol may be incorporated into the binder of the composition by simply admixing the polyol into the composition along with the interpolymer and other desired additives. Alternatively, the polyols may be employed as a portion of the interpolymer polymerization medium. For example, the water-soluble or water-dispersible polyether or polyester polyol can be utilized alone or along with water-miscible organic solvents in the polymerization of the monomers which form the interpolymer (see Example C).

In addition to minimizing water or solvent-popping and sagging problems in aqueous coatings of the invention, the use of these polyether or polyester polyols provides several other advantages. Thus, when these polyols are included in the composition along with crosslinking agents of the type referred to above, they participate in the curing of the compositions by being crosslinked through their hydroxyl functionality. At the same time, these polyols function as a cosolvent, lowering the viscosity of the composition and reducing the amount of volatile solvent needed for that purpose, thereby reducing atmospheric pollution.

The amounts of these polyether or polyester polyols which may be included in aqueous based coating compositions of the invention may vary considerably depending upon the thickness of the coating desired, humidity conditions and the like. In general, from about 5 percent to about 40 percent by weight of the polyol, based upon total binder (i.e., interpolymer, polyol and, if desired, crosslinker) solids may be included with a preferred amount being from 10 to 25 percent.

As indicated, insoluble crosslinked polymeric microparticles are added to solutions or dispersions of the above-described amide interpolymers and other desired additives to form the improved coating compositions of the invention.

The crosslinked polymeric microparticles employed in the compositions herein are prepared by the free radical addition copolymerization of at least one ethylenically unsaturated monomer of an alpha, beta-ethylenically unsaturated monocarboxylic acid and a crosslinking monomer selected from the group consisting of epoxy group-containing compounds, alkylenimines, organoalkoxysilanes and mixtures thereof in the presence of a dispersion stabilizer and a dispersing liquid in which the crosslinked polymer particles are insoluble, thereby forming a non-aqueous dispersion of the crosslinked polymer microparticles of relatively high concentration. For a detailed description of the preferred crosslinked polymeric microparticles and their method of preparation, reference may be had to copending application Ser. No. 559,949, filed Mar. 19, 1975, in the names of Joseph M. Makhlouf and Samuel Porter, Jr.

The crosslinked polymeric microparticles utilized in the compositions of the present invention are formed by the free radical addition copolymerization of an alpha, beta-ethylenically unsaturated monocarboxylic acid, at least one other copolymerizable ethylenically unsaturated monomer and a crosslinking monomer which can be an epoxy-group containing compound, an alkylenimine, an organoalkoxysilane, or a mixture thereof, in the presence of a dispersing liquid which is a solvent for the polymerizable monomers but a non-solvent for the resultant polymer and a dispersion stabilizer. The dispersion stabilizer employed in producing the microparticles utilized in the invention is a compound, usually polymeric, which contains at least two segments of which one segment is solvated by the dispersing liquid and a second segment is of different polarity than the first segment and is relatively insoluble (compared to the first segment) in the dispersing liquid.

Included among such dispersion stabilizers are polyacrylates and polymethacrylates, such as poly(lauryl methacrylate) and poly(2-ethylhexyl acrylate); diene polymers and copolymers such as polybutadiene and degraded rubbers; aminoplast resins, particularly highly naphtha-tolerant compounds such as melamine-formaldehyde resins etherified with higher alcohols (e.g., alcohols having 4 to 12 carbon atoms), for example, butanol, hexanol, 2-ethylhexanol, etc.; and other aminoplasts of similar characteristics such as certain resins based on urea, benzoguanamine and the like; and various copolymers designed to have the desired characteristics, for example, polyethylene-vinyl acetate copolymers.

Commonly utilized microparticles contain from about 0.5 to about 15 percent by weight of each of the acid monomer and the cross-linking monomer and are formed from the copolymerization of an alkyl acrylate or methacrylate monomer, such as methyl acrylate, ethyl acrylate, propyl acrylate, butyl acrylate, methyl methacrylate, ethyl methacrylate, propyl methacrylate, butyl methacrylate, or the like; an alpha, beta-ethylenically unsaturated monocarboxylic acid monomer such as acrylic acid or methacrylic acid; and an epoxy group-containing monomer such as glycidyl acrylate, glycidyl methacrylate or the like. The dispersing liquid is ordinarily an aliphatic hydrocarbon, and the preferred dispersion stabilizers are graft copolymers containing two polymer segments of which one segment is an anchor polymer of different polarity to said first segment and is relatively non-solvatable by the dispersing liquid, wherein said dispersion stabilizer contains pendant groups which have been addition copolymerized with said ethylenically unsaturated monomers. In the preparation of such polymeric microparticles, methyl methacrylate, methacrylic acid and glycidyl methacrylate are the especially preferred monomers.

A particularly preferred crosslinked polymeric microparticle for use in the compositions of the invention is a crosslinked microparticle formed by the free radical copolymerization of an alkyl acrylate or methacrylate; an alpha, beta-ethylenically unsaturated monocarboxylic acid; a hydroxyalkyl alkylenimine, and an organoalkoxysilane monomer; in the presence of the aliphatic hydrocarbon dispersing liquid and the above dispersion stabilizer. In preparing the particularly preferred microparticle, methyl methacrylate, methacrylic acid, hydroxyethyl ethylenimine, and gamma-methacryloxypropyltrimethoxysilane are especially preferred monomers.

As indicated above and as described in the copending application which has been incorporated herein by reference, the crosslinked polymeric microparticles are prepared in the form of a non-aqueous dispersion of relatively high concentration. They generally have a particle size range of about 0.1 to about 10 microns. The crosslinked microparticles utilized herein can be added to the solution or dispersion of amide interpolymers and the aminoplast crosslinking agent in several ways. Thus, the non-aqueous dispersion of crosslinked microparticles can be directly added to the solution or dispersion of the resin. If this method is employed, it is most convenient and preferred for purposes of compatibility and ease of mixing to first reduce or cut the dispersion with the same solvent utilized in the solution of dispersion of amide interpolymers and aminoplast resins. Alternatively, the non-aqueous dispersion of crosslinked polymeric microparticles can be recovered, such as by spray drying with a conventional spray drier to form a finely divided powder which can then be redispersed in the same type solvent or solvent mixture employed in the solution or dispersion of amide interpolymers and aminoplast resins and then added thereto, or in the cases where pigmentation is desired the powder itself can be added in with the grind vehicle.

In most cases, the overall composition may contain from about 50 percent to about 98 percent by weight of the amide interpolymer and from about 2 percent to about 50 percent, preferably from 2 to 20 percent by weight of the crosslinked polymeric microparticles.

The composition may also contain other additives such as catalysts, plasticizers, fillers, pigments and the like. The compositions of the invention are particularly useful in the deposition of films containing metallic flake pigments such as aluminum, nickel, stainless steel, or the like, as the pattern control of the resulting film is excellent.

The compositions are quite useful as coatings on substrates. The compositions may be applied to a substrate and baked at temperatures ranging from 180° to 500° F. and for times ranging from 1 to 30 minutes to cure the coating on the substrate. The coatings may be applied by any conventional means such as spray coating, dip coating, roll coating, and the like. The preferred method is spray coating as the compositions containing crosslinking polymeric microparticles can be applied with good deposition efficiency and rapid film build.

Any substrate such as paper, metal, wood, paperboard, plastic, foam, extruded rubber, and the like may be coated with the composition.

The following examples set forth specific embodiments of the instant invention. However, the invention is not to be construed as being limited to these embodiments for there are, of course, numerous possible variations and modifications. All parts and percentages in the examples, as well as throughout the specification, are by weight unless otherwise indicated.

EXAMPLE A

This example illustrates the preparation of an amide interpolymer component utilized in the compositions of this invention.

To a 65 gallon reactor equipped with stirrer, thermometer, condenser, heating mantle, nitrogen inlet and an azeotropic decanter prefilled with a 3:1 mixture of N-butanol and xylene was charged 20 pounds of acrylamide, 5.0 pounds of methacrylic acid, 40.0 pounds of methacrylonitrile, 85.0 pounds of butyl acrylate, 50.0 pounds of styrene, 61.3 pounds of butanol, 61.3 pounds of xylene, 1.0 pound of tertiary dodecyl mercaptan, 300.0 grams of butyl peroxyisopropylcarbonate and 2.6 pounds of Solvesso 150 (a high boiling aromatic solvent having a boiling point range of 185° to 200° C.) The reaction mixture was then heated to azeotropic reflux for a period of about 3 hours. After this, 73.0 grams of butyl isoperoxypropylcarbonate and 2.6 pounds of Solvesso 150 were added and the mixture held at reflux for 2 hours. Following this addition, the nitrogen inlet was closed and 42.0 pounds of butyl Formcel (a 40 percent solution of formaldehyde in n-butanol), 240.0 grams of maleic anhydride, 18.0 pounds of Solvesso 150 and 22.0 pounds of xylene were added to the reaction mixture. After this addition was complete, 530.0 grams of butyl peroxyisopropyl carbonate and 16.0 pounds of Solvesso 150 were added over a 6 hour period. During this period approximately 8.2 pounds of water were removed. After this addition was completed, the apparatus was set for a total distillation and 1.7 pounds of n-butanol and 22.8 pounds of xylene were added. The reaction mixture was then held at total distillation until 24.5 pounds of distillate were removed. After this, the reaction mixture was cooled and filtered. Finally, 5.3 pounds of n-butanol and 10.6 lbs of Solvesso 150 were added to the reaction mixture as kettle rinse and blended in.

The resultant amide interpolymer had a solids content of 52.0 percent by weight, an acid value of 8.5 and a Gardner-Holdt viscosity of Z1-Z2 at 25° C.

EXAMPLE B

This example illustrates a preferred method of preparing an amide interpolymer component of the compositions. In this example, a substituted amide (i.e., N-(butoxymethyl)acrylamide) was first prepared by reacting acrylamide with formaldehyde and n-butanol as described in the specification above and then the substituted amide (i.e., N-(butoxymethyl)acrylamide) was copolymerized with the acid monomer and the other desired ethylenically unsaturated monomers. The copolymerization procedure utilized was essentially the same as in Example A except for the use of the previously prepared N-(butoxymethyl)acrylamide as a starting monomer and except for the fact that the monomer charge on a weight solids basis consisted of 16.7 percent N-(butoxymethyl)acrylamide, 2.3 percent methacrylic acid, 40.3 percent styrene and 40.7 percent ethyl acrylate.

The resultant amide interpolymer had a solids content of 52.0 percent by weight, an acid value of 7.5 and a Gardner-Holdt viscosity of Z.

EXAMPLE C

This example illustrates the preparation of an aqueous dispersion consisting of an amide interpolymer and a sucrose polyether polyol. In the Example, the sucrose polyether polyol was utilized as a portion of the polymerization medium.

To a reactor equipped with reflux condenser, heating means, stirrer, thermometer and nitrogen inlet was charged 300.9 grams of a 100 percent solids sucrose polyether polyol (formed by reacting 1.0 mole of sucrose and 20.5 moles of propylene oxide) having a viscosity of about 6,500 centipoises and an OH value of 325; 137.3 grams of diethylene glycol monomethyl ether (hereinafter DEGMME); 345.0 grams of a feed mixture (hereinafter referred to for convenience as "Feed A") containing, on a monomer solids basis, 58.6 percent styrene, 15.0 percent methyl methacrylate, 6.7 percent acrylic acid, 19.7 percent N-(butoxymethyl)acrylamide, 3.0 percent tertiary dodecyl mercaptan and 1.0 percent alpha, alpha'-azobis(isobutyronitrile); and 6.0 grams of a feed mixture (hereinafter referred to for convenience as "Feed B") containing 25 percent 2-acrylamide-2-methyl propane sulfonic acid, 62.5 percent deionized water, and 12.5 percent dimethylethanolamine. The mixture was heated under nitrogen to about 105° C., at which time an exotherm was observed. Heating and nitrogen flow were then suspended during the period of exotherm. After conclusion of the exotherm, heating under nitrogen was resumed and the mixture was heated to about 130° C. At this point, an additional 1049.0 grams of feed A and 18.0 grams of feed B were added to the reactor over a period of about 3 hours. When this addition was completed, a total of 5.1 grams of tertiary butyl perbenzoate and 15.0 grams of DEGMME were added to the reactor in 3 equal increments (i.e., 1.7 grams of tertiary butyl perbenzoate and 5.0 grams of DEGMME) over a period of about 5 hours with the first and second increments being added at 1.5 hour intervals. Following this addition 46.0 grams of dimethylethanolamine were added to the reactor. Then the reaction mixture was cooled to 75° C. and 2442 grams of deionized water were added to the reactor. The reaction product was then cooled and filtered.

The resultant amide interpolymer-sucrose polyether polyol dispersion had a total solids content of 34.1 percent, a viscosity of 1860 centipoises and an acid value of 13. The aqueous medium consisted of 87.6 percent water and 12.6 percent organic solvents.

EXAMPLE D

This example illustrates the preparation of a preferred type of crosslinked polymeric microparticles for use in the compositions of this invention.

To a 5-liter flask equipped with an up and over condenser, agitator, thermometer and heating mantle were charged 1250 grams of heptane, 540 grams of Isopar H (a mixed aliphatic hydrocarbon having an initial boiling point of 350° F. and a dry point of 371° F. with 90 percent distilling between 353°-357° F., available from Humble Oil and Refining Company), 50 grams of methyl methacrylate, 10 grams of a dispersion stabilizer comprising a 50.3 percent solids solution of 45.4 percent methyl methacrylate, 4.2 percent glycidyl methacrylate, 0.9 percent methacrylic acid, and 49.5 percent of a reaction product of 89.2 percent poly-12-hydroxystearic acid and 10.8 percent glycidyl methacrylate in a solvent mixture comprising 52.1 percent butyl acetate, 40.0 percent VM&P naphtha and 7.9 percent toluene and 4 grams of azobis(isobutyronitrile). The mixture was heated to reflux (about 103° C.) and held for about 30 minutes. Then over a period of about 3 hours were added 1288 grams of methyl methacrylate, 70 grams of glycidyl methacrylate, 42 grams of methacrylic acid, 4.2 grams of Armeen DMCD (dimethyl cocoamine, available from Armour Chemical Company), 200 grams of the above dispersion stabilizer, 14 grams of octyl mercaptan and 5.6 grams of azobis(isobutyronitrile). After this addition was completed, reflux was continued for an additional 30 minutes and then an additional 2.8 grams of azobis(isobutyronitrile) were added. Reflux was then continued for another 1 hour and the mixture was then cooled and filtered.

The resultant polymeric dispersion consisting essentially of crosslinked polymeric microparticles had a total solids content determined at 150° C. of 44.9 percent by weight.

EXAMPLE E

This example illustrates the preparation of an additional type of crosslinked microparticles which may be utilized in the compositions of the invention.

To a 5-liter flask equipped with an up and over condenser, agitator, thermometer, and heating mantle was charged 1900 grams of Napoleum 30 (a medium boiling naphtha from Kerr-McGee Company), 950 grams of hexane and 950 grams of heptane. The mixture was heated to reflux (about 85° C.) and then 200 grams of methyl methacrylate; 34 grams of dispersion stabilizer comprising a 50.3 percent glycidyl methacrylate, 0.9 percent methacrylic acid, and 49.5 percent of a reaction product of 89.2 percent poly-12-hydroxystearic acid and 10.8 percent glycidyl methacrylate in a solvent solution comprising 52.1 percent butyl acetate, 40.0 percent WM&P naphtha, and 7.9 percent toluene, and 14.3 grams of azobis(isobutyronitrile) were added. After this addition was complete, reflux was continued for about 20 minutes and then over a 3-hour period was added 4060 grams methyl methacrylate, 226 grams of gamma-methacryloxypropyltrimethoxysilane, 595 grams of the above dispersion stabilizer, 34.0 grams of methacrylic acid, 34.0 grams of 2-hydroxyethyl ethylenimine, 18.0 grams of azobis(isobutyronitrile) and 18.0 grams of p-octyl mercaptan. After this addition, reflux was continued for another 1.5 hours and the mixture was then cooled and filtered.

The resultant polymeric dispersion consisting essentially of crosslinked polymer particles (i.e., microgel particles) had a total solids content determined at 150° C. of 54.5 percent by weight.

EXAMPLES 1-2

These examples illustrate the effect of adding the crosslinked microparticles to an amide interpolymer based coating composition. In these examples, a control composition comprising an aluminum pigmented amide interpolymer based coating composition (Example 1) and a test composition (Example 2) having essentially the same composition except that it contained approximately 10 percent by weight solids of the crosslinked polymeric microparticles of Example D were prepared using standard acrylic resin coating composition mixing procedures. The compositions had the following formulations:

| Ingredients | Parts by Weight | |
|---|---|---|
| | Example No. 1 | Example No. 2 |
| | (Control) | |
| Amide interpolymer of Example A | 200.0 | 180.0 |
| Pigment paste* | 10.0 | 10.0 |
| Crosslinked microparticle dispersion of Example D | — | 22.0 |
| Xylene | 90.0 | 88.0 |

| Ingredients | Parts by Weight | |
|---|---|---|
| | Example No. 1 | Example No. 2 |
| | 300.0 | 300.0 |

*A pigment paste consisting of 23.7 percent aluminum flake, 5.9 percent phthalocyanine blue, 16.2 percent methyl-12-hydroxystearate, 27.1 percent VM&P naphtha and 27.1 percent methyl ethyl ketone. The paste was prepared in a conventional manner by stirring in the aluminum flake.

The above compositions were sprayed onto metal substrates utilizing a conventional spray gun. Example 1, the control composition, showed very poor metallic pattern control, while Example 2, the composition containing the crosslinked microparticles, showed excellent metallic pattern control.

EXAMPLES 3-4

These examples further illustrate the effect of adding crosslinked polymeric microparticles to an amide interpolymer based coating composition. In these examples, an aluminum pigmented control composition (Example 3) was prepared from the amide interpolymer of Example B, then a test composition (Example 4) was prepared by adding 10 percent by weight solids of the crosslinked polymeric microparticles of Example D to a portion of the control composition. The control and test compositions were prepared using standard mixing procedures and techniques employed in the acrylic resin coating art. The compositions had the following formulations:

| | Parts by Weight | |
|---|---|---|
| | Example No. 3 | Example No. 4 |
| | (Control) | |
| Amide interpolymer of Example B | 187.0 | 167.0 |
| Pigment paste* | 12.0 | 12.0 |
| Crosslinked polymeric microparticle dispersion of Example D | — | 22.0 |
| Xylene | 92.0 | 90.0 |
| Ethylene glycol monoethyl ether acetate | 33.0 | 33.0 |
| Total | 324.0 | 324.0 |

*A pigment paste consisting of 38.0 percent aluminum flake, 48.0 percent of the amide interpolymer of Example B and 14.0 percent xylene. The paste was prepared in conventional manner by stirring in the aluminum flake.

The above compositions were sprayed onto metal substrates, utilizing a conventional spray gun. Example 3, the control composition, showed excessive sagging and very poor metallic pattern control while Example 4, the composition containing the crosslinked polymeric microparticles, showed no sagging and had excellent metallic pattern control.

EXAMPLES 5-6

These examples illustrate the effect of adding the particularly preferred crosslinked polymeric microparticles of Example D to amide interpolymer based coating compositions. The compositions were prepared in accordance with the procedures employed in Examples 1-4 and had the following formulations:

| | Parts by Weight | |
|---|---|---|
| Ingredients | Example No. 5 | Example No. 6 |
| | (Control) | |
| Amide interpolymer of Example B | 187.0 | 167.0 |
| Pigment paste as in Examples 3 and 4 | 12.0 | 12.0 |
| Crosslinked polymeric microparticle dispersion of Example D | — | 22.0 |
| Xylene | 92.0 | 90.0 |
| Ethylene glycol monoethyl ether | 33.0 | 33.0 |

-continued

| Ingredients | Parts by Weight | |
|---|---|---|
| | Example No. 5 | Example No. 6 |
| Total | 324.0 | 324.0 |

The above compositions were spray applied onto metal substrates, utilizing a conventional spray gun. Example 5, the control composition, showed excessive sagging and very poor metallic control while Example 6 showed no sagging and excellent metallic pattern control.

EXAMPLE 7

This example illustrates the preparation of an aqueous coating composition of the invention. In addition to the interpolymer and crosslinked microparticles, a polyether polyol, crosslinking agent and other optional ingredients are included.

The first step in the preparation of the aqueous composition was the preparation of a pigment paste (designated A) having the following formulation:

| A. | Pigment Paste Ingredients | Parts by Weight |
|---|---|---|
| | Acrysol I-94 [1] | 103.8 |
| | Deionized Water | 100.0 |
| | Dimethylethanolamine | 4.8 |
| | Butyl Cellosolve [2] | 25.6 |
| | Titanium dioxide | 544.0 |
| | Lamp black | 6.6 |

[1] An acrylic polymer pigment dispersion vehicle having a solids content of 30.0 percent, a pH of 3-5 and a viscosity of about 100 available from Rohm & Haas Corporation.
[2] ethylene glycol monobutyl ether The above pigment paste was prepared in conventional manner utilizing standard pigment paste mixing equipment and procedures.

The second step in the preparation of the aqueous composition was to blend the above pigment paste with an aqueous dispersion of amide interpolymer-polyol, a crosslinking agent and other additives to form a composition (designated B) having the following formulation:

| B. | Ingredients | Parts by Weight |
|---|---|---|
| | Pigment paste of A | 98.2 |
| | Interpolymer-sucrose polyether polyol dispersion of Example C | 358.0 |
| | Defoamer* | 1.7 |
| | Triethylene glycol | 9.6 |
| | Methylolated melamine formaldehyde (crosslinker) | 10.4 |
| | Methylon 75108 (crosslinker)** | 12.0 |
| | Silicone surfactant (10% in butyl Cellosolve) | 1.2 |
| | Deionized Water | 20.0 |

*A defoamer designated Balab Bubble Breaker available from Witco Chemical Company
**A methylol phenol ether composition commercially available from General Electric Corporation. It is essentially a mixture of the allyl ethers of mono-, di- and trimethylol phenols, with the trimethylol derivatives predominantly, and has a solids content of 100 percent and a viscosity (25° C.) of 2000–4000 centipoises.

The final step in the preparation of the aqueous coating composition was to blend the above composition [i.e., composition designated B] with a paste containing the crosslinked polymeric microparticles. The final coating composition had the following formulation:

| Ingredients | Parts by Weight |
|---|---|
| Composition of B, above | 250.7 |
| Crosslinked polymeric microparticle* paste | 39.5 |
| Deionized water | 25.0 |

*A paste formed from a mixture containing 50 percent Acrysol I-94, 20 percent crosslinked polymeric microparticles in the form of dry powder formed by spray drying the crosslinked polymeric microparticle dispersion of Example D, 20 percent deionized water, 9 percent diethylene glycol butyl ether and 1.0 percent diethyl ethanolamine.

The above aqueous coating composition containing the crosslinked polymeric microparticles was flow coated onto metal panels and baked 30 minutes at 300° F. For comparison purposes, a control composition having a substantially similar composition except that it did not contain the microparticles (i.e., the composition designated B above) was also flow coated onto metal panels and cured under the same conditions. The aqueous coating composition containing the crosslinked polymeric microparticles in comparison to the control composition exhibited less blistering and bubbling minimizing water or solvent popping and sagging problems and produced a much smoother and less grainy film, particularly when the compositions were applied at higher film thicknesses.

As illustrated by the above examples, the coating compositions of the invention which contain crosslinked polymeric microparticles exhibit improved metallic pattern control and application characteristics, as well as other advantageous properties.

While specific ingredients have been exemplified in the examples, it should be observed that other ingredients of the type described in the specification can be substituted for those materials and similar advantageous results can be obtained. Thus, other interpolymers of the type described heretofore may be substituted for the interpolymer employed. For example, interpolymers derived from N-(butoxymethyl)methacrylamide, methacrylic acid and other ethylenically unsaturated monomers may be used. Also, the crosslinked polymeric microparticles illustrated in Examples 1–7 may be replaced by the crosslinked polymeric microparticles of Example E and similar advantageous results will be obtained. Further, the methylolated melamine formaldehyde resin and methylol phenol ether crosslinking units may be replaced by various other aminoplast resins and phenolic resins. For example, hexa(methoxymethylol)melamine and phenol formaldehyde may be employed. Moreover, various other polyether and polyester polyols can be utilized in place of sucrose polyether polyol. For example, a polycaprolactone polyol can advantageously be utilized.

According to the provisions of the Patent Statutes there is described above the invention and what are considered to be its best embodiments. However, within the scope of the appended claims, it is to be understood that the invention can be practiced otherwise than as specifically described.

We claim:
1. In a coating composition comprising a solution or dispersion of an interpolymer consisting essentially of the interpolymerization product of:

A. from about 2.5 percent to about 50 percent of an unsaturated carboxylic acid amide in units of the structure:

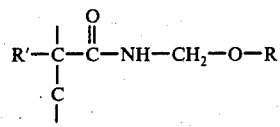

wherein R' is hydrogen or lower alkyl and R is hydrogen or lower alkyl with at least 50 percent of the groups represented by R being lower alkyl;

B. from about 1 percent to about 25 percent of an alpha, beta-ethylenically unsaturated carboxylic acid; and C. at least one other copolymerizable ethylenically unsaturated monomer containing a $CH_2=C<$ group;

wherein the improvement comprises the addition to said solution or dispersion of from about 2 percent to about 50 percent of by weight crosslinked polymeric microparticles formed by the free radical addition copolymerization of from about 0.5 percent to about 15 percent of an alpha, beta-ethylenically unsaturated monocarboxylic acid, at least one other copolymerizable ethylenically unsaturated monomer, and from about 0.5 percent to about 15 percent of a crosslinking monomer selected from the group consisting of epoxy group-containing compounds, alkylenimines, organoalkoxysilanes and mixtures thereof in the presence of a dispersing liquid which is a solvent for the polymerizable monomers but a non-solvent for the resultant polymer, and a dispersion stabilizer containing at least two segments of which one segment is solvated by said dispersing liquid and a second segment is of different polarity than said first segment and is relatively insoluble in said dispersing liquid.

2. The composition of claim 1 wherein said unsaturated carboxylic acid amide is an N-alkoxyalkyl-substituted amide or a mixture of an N-alkoxyalkyl-substituted amide and N-methylolamide.

3. The composition of claim 1 wherein said carboxylic acid amide in N-(butoxymethyl)acrylamide or N-(butoxymethyl)-methacrylamide.

4. The composition of claim 1 wherein said alpha, beta-ethylenically unsaturated carboxylic acid is acrylic acid or methacrylic acid.

5. The composition of claim 1 wherein said other ethylenically unsaturated monomer containing a $CH_2=C<$ group is selected from the group consisting of hardening and flexibilizing monomers and mixtures thereof.

6. The composition of claim 5 wherein said hardening monomer is styrene, vinyl toluene or an alkyl methacrylate having from 1 to 4 carbon atoms.

7. The composition of claim 5 wherein said flexibilizing monomer is an alkyl or substituted alkyl ester of acrylic acid or methacrylic acid with the alkyl groups having 1 to 13 carbon atoms in the case of acrylic esters and 5 to 16 carbon atoms in the case of methacrylic esters.

8. The composition of claim 1 wherein said other ethylenically unsaturated monomer is a mixture of monomers comprising from 5 to 75 percent of hardening monomers and from 5 to 75 percent of flexibilizing monomers.

9. The composition of claim 1 wherein the liquid medium of said solution or dispersion comprises an organic solvent.

10. The composition of claim 1 wherein the liquid medium of said solution or dispersion comprises water or a mixture of a water-miscible organic solvent and water and said interpolymer contains salt groups.

11. The composition of claim 1 wherein the alpha, beta-ethylenically unsaturated monocarboxylic acid employed in forming such microparticle is acrylic acid or methacrylic acid.

12. The composition of claim 1 wherein the other copolymerizable ethylenically unsaturated monomer employed in forming said microparticle is an alkyl acrylate or alkyl methacrylate.

13. The composition of claim 1 wherein the other copolymerizable ethylenically unsaturated monomer employed in forming the microparticle is methyl methacrylate.

14. The composition of claim 1 wherein the crosslinking monomer employed in forming said microparticle is an epoxy group-containing compound.

15. The composition of claim 14 wherein the epoxy group-containing compound is glycidyl methacrylate.

16. The composition of claim 1 wherein the crosslinking monomer employed in forming said microparticle is a mixture of monomers consisting of an alkylenimine and an organoalkoxysilane.

17. The composition of claim 16 wherein said alkylenimine is hydroxyethyl ethylenimine and said organoalkoxysilane is gamma-methacryloxypropyltriethoxysilane.

18. The composition of claim 1 wherein the dispersion stabilizer employed in forming said microparticle is a graft copolymer containing two polymeric segments of which one segment is solvated by said dispersing liquid and the second segment is an anchor polymer of different polarity to said first segment and is relatively non-solvatable by said dispersing liquid and wherein said dispersion stabilizer contains pendant groups which have been addition polymerized with said ethylenically unsaturated monomers.

19. The composition of claim 18 wherein said dispersion stabilizer is formed by graft copolymerizing the reaction product of glycidyl methacrylate and poly-(12-hydroxystearic acid), with methyl methacrylate and glycidyl methacrylate and the resulting copolymer product containing pendant epoxy groups is reacted with methacrylic acid.

20. The composition of claim 1 wherein said monocarboxylic acid of said microparticle is methacrylic acid, said other ethylenically unsaturated monomer of said microparticle is methyl methacrylate, and said crosslinking monomer of said microparticle is glycidyl methacrylate.

21. The composition of claim 1 wherein said monocarboxylic acid of said microparticle is methacrylic acid, said other ethylenically unsaturated monomer of said microparticle is methyl methacrylate and said crosslinking monomer of said microparticle is a mixture of gamma-methacryloxypropyltrimethoxysilane and hydroxyethyl ethylenimine.

22. The composition of claim 1 wherein the liquid medium of said dispersion or solution of interpolymer is water or a mixture of water-miscible organic solvent and water and said composition further comprises:

A. from about 5 to about 40 percent by weight of binder solids of a water-soluble or water-dispersible polyether polyol or polyester polyol having a molecular weight of at least 300, and B. from about 5 percent to about 40 percent by weight of binder solids of a crosslinking agent selected from the group consisting of aminoplast resins, phenolic resins and mixtures thereof.

23. The composition of claim 22 wherein said polyether polyol is a sucrose polyether polyol.

24. The composition of claim 22 wherein said crosslinking agent is an aminoplast resin.

25. The composition of claim 24 wherein said crosslinking agent is hexa(methoxymethyl)melamine.

26. The composition of claim 22 wherein said crosslinking agent is a mixture of an aminoplast resin and a phenolic resin.

27. The composition of claim 26 wherein said aminoplast resin is hexa(methoxymethyl)melamine and said phenolic resin is a methylol phenol ether.

* * * * *